F. R. SILLS.
POWER SHOVEL.
APPLICATION FILED JUNE 2, 1920.

1,394,230.

Patented Oct. 18, 1921.
2 SHEETS—SHEET 1.

FIG-1-

Inventor.
Frederick R. Sills,
by Herbert W. T. Jenner.
Attorney.

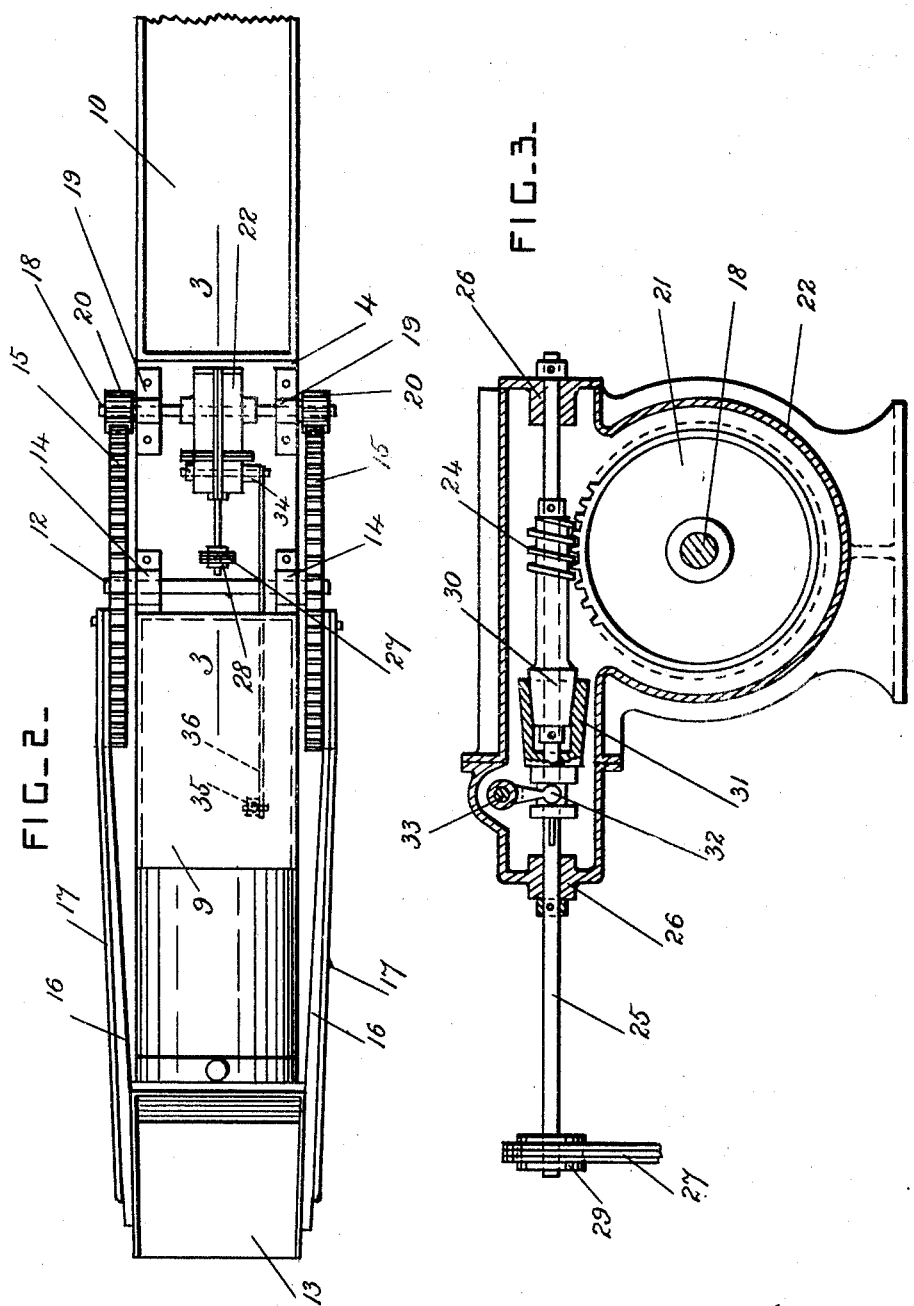

UNITED STATES PATENT OFFICE.

FREDERICK R. SILLS, OF STATESVILLE, NORTH CAROLINA, ASSIGNOR OF ONE-HALF TO CAROLINA MOTOR COMPANY, OF STATESVILLE, NORTH CAROLINA.

POWER-SHOVEL.

1,394,230. Specification of Letters Patent. Patented Oct. 18, 1921.

Application filed June 2, 1920. Serial No. 386,123.

*To all whom it may concern:*

Be it known that I, FREDERICK R. SILLS, a citizen of the United States, residing at Statesville, in the county of Iredell and State of North Carolina, have invented certain new and useful Improvements in Power-Shovels, of which the following is a specification.

This invention relates to shovels mounted on motor cars and used in making roads, removing loose material from excavations, and snow or street sweepings from streets, and for other similar purposes; and it consists in the novel construction and combination of the parts hereinafter fully described and claimed.

In the drawings, Figure 1 is a side view of the front end portion of a motor car provided with a shovel according to this invention. Fig. 2 is a plan view of the principal parts shown in Fig. 1. Fig. 3 is a longitudinal section through the driving and clutch mechanisms, taken on the line 3—3 in Fig. 2.

The motor car is provided with a frame 4 and front ground wheels 5, and is on any approved construction. The motor 6 which actuates the shovel is shown secured to the middle part of the length of the car frame, and it has a longitudinal driving shaft 7. This motor may be used to drive the car, and may have a shaft 8 operatively connected with the driving shaft 7 and extending rearwardly to actuate suitable transmission mechanism for driving the rear road wheels. These parts are not shown as they are of any approved construction. If desired however a separate motor can be provided for driving the car.

The car has any suitable cab 9 and a seat for the operator at its front part, and a receptacle or hopper 10 for dirt is arranged to the rear of the cab and is supported by the frame 2. A rock-shaft 12 is mounted to oscillate in bearings 14 secured to the frame 2 and arranged behind the cab, and two toothed segments 15 are secured to the end portions of this shaft, and are arranged one at each side of the machine outside the frame 2.

Arms 16 are secured to the segments 15, and are arranged radially of the shaft 12. These arms are long enough to project at the front end of the machine, as shown in full lines in Fig. 1, and they have a shovel 13 of any approved form secured to their free end portions. Braces 17 are provided between the free end portions of the arms 16 and the middle portions of the rims of the segments.

A driving shaft 18 is journaled in bearings 19 secured to the frame, and is arranged crosswise of the machine to the rear of the rock-shaft 12. Toothed pinions 20 are secured on the end portions of the shaft 18, and gear into the two toothed segments. A worm wheel 21 is secured on the middle part of the cross-shaft 18, and is inclosed in a suitable casing 22, so that it may run in oil or grease. A worm 24 is mounted loosely on a countershaft 25 which is journaled in suitable bearings 26 supported by the frame 2, and this worm gears into the worm wheel 21. The countershaft 25 is driven from the motor shaft 7 by means of a drive chain 27 which passes over sprocket wheels 28 and 29, secured on the shafts 7 and 25 respectively. The direction of revolution of the countershaft is reversed by reversing the motor 6 in any approved way, but intermediate reversing mechanism of any approved sort may be used if it is desirable to have the motor run in one direction only.

A clutch member 30 is secured to the worm 24, and a slidable clutch member 31 is splined on the countershaft 25, and is operated by means of an arm 32 which is pivoted on a pin 33 projecting from the casing 22.

An arm 34 is secured to the arm 32, and is operated by means of a hand lever 35 in the cab and a connecting-rod 36.

The shovel is filled when in its lowered position, as shown in full lines in Fig. 1, by propelling the motor car forwardly. The shovel is raised by placing the worm in driving connection with the motor by means of the clutch, and the contents of the shovel are discharged into the receptacle 10 by gravity when the shovel has been raised to the position shown in dotted lines in Fig. 1. The direction of motion of the motor is then reversed to return the empty shovel to its lower position and enable it to be refilled.

What I claim is:

1. In a power shovel, a motor car provided with a frame, a rock-shaft mounted in bearings on the frame, a receptacle for dirt arranged on the frame to the rear of the rock-shaft, toothed segments secured on the end portions of the rock-shaft, arms secured to the toothed segments, a shovel secured between the free end portions of the said arms and adapted to scrape up road material in front of the motor car, a driving shaft journaled in the frame to the rear of the rock-shaft, toothed pinions secured on the end portions of the said driving shaft and gearing into the said toothed segments, a worm wheel secured on the said driving shaft, a countershaft supported by the frame, a worm mounted loosely on the countershaft and gearing into the worm wheel, means for revolving the countershaft in each direction, a clutch member revolving with the worm, and a slidable clutch member revolving with the countershaft and adapted to revolve the aforesaid clutch member and the worm.

2. In a power shovel, a motor car provided with a frame, a rock-shaft mounted in bearings on the frame, a receptacle for dirt arranged on the frame to the rear of the rock-shaft, toothed segments secured on the end portions of the rock-shaft, arms secured to the toothed segments, a shovel secured between the free end portions of the said arms and adapted to scrape up road material in front of the motor car, a driving shaft journaled in the frame to the rear of the rock-shaft, toothed pinions secured on the end portions of the said driving shaft and gearing into the said toothed segments, a worm wheel secured on the driving shaft, a countershaft supported by the frame, a worm mounted loosely on the countershaft and gearing into the worm wheel, a motor provided with a driving shaft arranged parallel to the countershaft, sprocket wheels secured on the motor shaft and countershaft, a drive chain passing over the said sprocket wheels, a clutch member revolving with the worm, and a slidable clutch member revolving with the countershaft and adapted to revolve the aforesaid clutch member and the worm.

In testimony whereof I have affixed my signature.

FREDERICK R. SILLS.